(12) United States Patent
Tanaka et al.

(10) Patent No.: US 8,088,541 B2
(45) Date of Patent: Jan. 3, 2012

(54) POLYVINYL ACETAL RESIN, ELECTROPHOTOGRAPHIC PHOTOSENSITIVE MEMBER, PROCESS CARTRIDGE, AND ELECTROPHOTOGRAPHIC APPARATUS

(75) Inventors: Masato Tanaka, Tagata-gun (JP); Atsushi Fujii, Yokohama (JP); Yuka Ishiduka, Suntou-gun (JP); Masataka Kawahara, Mishima (JP); Masaki Nonaka, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 12/091,191

(22) PCT Filed: Dec. 5, 2006

(86) PCT No.: PCT/JP2006/324618
§ 371 (c)(1),
(2), (4) Date: Apr. 23, 2008

(87) PCT Pub. No.: WO2007/066790
PCT Pub. Date: Jun. 14, 2007

(65) Prior Publication Data
US 2009/0123176 A1    May 14, 2009

(30) Foreign Application Priority Data
Dec. 7, 2005  (JP) ................................. 2005-353490

(51) Int. Cl.
*G03G 15/02* (2006.01)
(52) U.S. Cl. .................. 430/59.2; 430/59.3; 430/58.05; 430/58.35; 430/58.5; 430/96; 399/111; 399/168

(58) Field of Classification Search ............... 430/59.2, 430/59.3, 96, 58.05, 58.35, 58.5; 399/111, 399/168
See application file for complete search history.

(56) References Cited

U.S. PATENT DOCUMENTS

| | | | |
|---|---|---|---|
| 3,779,750 A | 12/1973 | Merrill et al. ..................... 96/1.5 |
| 4,717,636 A | 1/1988 | Takahashi et al. ............... 430/58 |
| 4,734,348 A | 3/1988 | Suzuki et al. .................... 430/96 |
| 5,453,342 A | 9/1995 | Go et al. .......................... 430/58 |
| 5,558,964 A * | 9/1996 | Yoshihara et al. ............. 430/59.5 |
| 6,248,490 B1 | 6/2001 | Suzuki et al. ..................... 430/69 |
| 2005/0111880 A1 | 5/2005 | Fujii et al. ...................... 399/159 |
| 2006/0172208 A1* | 8/2006 | Tanaka et al. ................. 430/59.4 |

FOREIGN PATENT DOCUMENTS

| EP | 0 219 862 A2 | 10/1986 |
|---|---|---|
| EP | 1 006 414 A1 | 11/1999 |
| EP | 1 536 292 A2 | 11/2004 |
| JP | 62-030254 | 2/1987 |
| JP | 62-095537 | 5/1987 |
| JP | 05-045899 | 2/1993 |
| JP | 11-174701 | * 7/1999 |
| JP | 11-174701 A | 7/1999 |

OTHER PUBLICATIONS

Official Action dated May 20, 2009 in EP 06834373.0-1217, 5 pages.

* cited by examiner

*Primary Examiner* — Thorl Chea
(74) *Attorney, Agent, or Firm* — Fitzpatrick, Cella, Harper & Scinto

(57) ABSTRACT

The present invention relates to a polyvinyl acetal resin having a specific repeating structural unit, an electrophotographic photosensitive member using the polyvinyl acetal resin, and a process cartridge and an electrophotographic apparatus each having the electrophotographic photosensitive member.

7 Claims, 5 Drawing Sheets

POLYVINYL ACETAL RESIN, ELECTROPHOTOGRAPHIC PHOTOSENSITIVE MEMBER, PROCESS CARTRIDGE, AND ELECTROPHOTOGRAPHIC APPARATUS

TECHNICAL FIELD

The present invention relates to a polyvinyl acetal resin, an electrophotographic photosensitive member containing a polyvinyl acetal resin, and a process cartridge and an electrophotographic apparatus each having the electrophotographic photosensitive member.

BACKGROUND ART

Electrophotographic photosensitive members each using an organic material (organic electrophotographic photosensitive members) have started to be mounted on a large number of electrophotographic apparatuses (such as a copying machine and a printer) in recent years. The research and development of a material to be used in an electrophotographic photosensitive member have been vigorously conducted.

The research and development of a charge generation substance typified by a phthalocyanine pigment or an azo pigment have been particularly vigorously conducted. Various proposals concerning a novel compound and the novel crystal form of a pigment have been made with a view to improving sensitivity and durability.

In contrast, at present, research and development concerning a binder resin for a photosensitive layer, in particular, a binder resin for a charge generation layer of a laminated photosensitive layer have not been conducted very vigorously.

Under such present circumstances, for example, JP-A-62-030254 and JP-A-05-045899 each disclose a polyvinyl benzal derivative as a resin having an improving effect on sensitivity and a reducing effect on a residual potential. In addition, JP-A-62-035537 discloses a polyvinyl acetal derivative.

In actuality, however, a commercially available product such as polyvinyl butyral is used in most cases in consideration of coating property and the property with which a charge generation substance is dispersed. Accordingly, the properties of the charge generation substance are not always exerted sufficiently.

DISCLOSURE OF INVENTION

An object of the present invention is to: cause a charge generation substance to exert its properties (electrophotographic properties) sufficiently; and provide a resin excellent in coating property and property with which the charge generation substance is dispersed, the properties being said to be contradictory to the electrophotographic properties. Another object of the present invention is to provide an electrophotographic photosensitive member using such resin, and a process cartridge and an electrophotographic apparatus each having the electrophotographic photosensitive member.

According to the present invention, there is provided a polyvinyl acetal resin including a repeating structural unit represented by the following general formula (1):

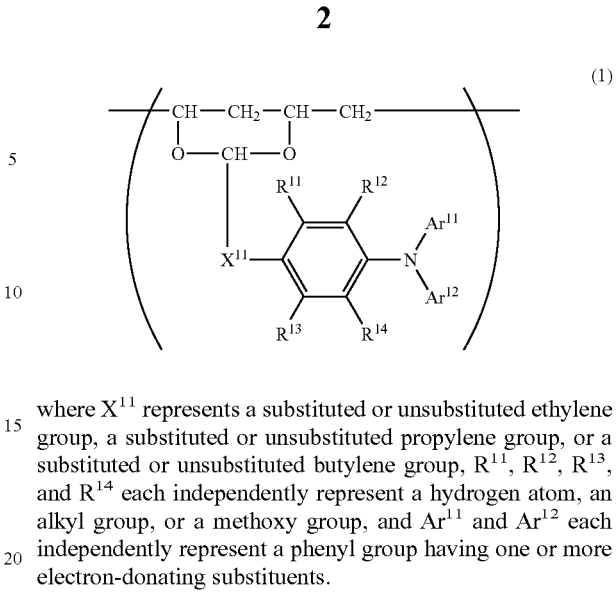

where $X^{11}$ represents a substituted or unsubstituted ethylene group, a substituted or unsubstituted propylene group, or a substituted or unsubstituted butylene group, $R^{11}$, $R^{12}$, $R^{13}$, and $R^{14}$ each independently represent a hydrogen atom, an alkyl group, or a methoxy group, and $Ar^{11}$ and $Ar^{12}$ each independently represent a phenyl group having one or more electron-donating substituents.

According to the present invention, there is provided an electrophotographic photosensitive member, including: a support; and a photosensitive layer provided on the support, in which the photosensitive layer contains the polyvinyl acetal resin.

Further, according to the present invention, there is provided a process cartridge which: integrally supports the electrophotographic photosensitive member and at least one means selected front the group consisting of a charging means, a developing means, a transfer means, and a cleaning means; and is detachably countable in an electrophotographic apparatus main body.

Further, according to the present invention, there is provided an electrophotographic apparatus including: the electrophotographic photosensitive member; a charging means; an exposing means; a developing means; and a transfer means.

A coating liquid for a photosensitive layer (coating liquid for a charge generation layer) using the polyvinyl acetal resin of the present invention has good property with which a charge generation substance is dispersed, and is excellent in coating property. In addition, an electrophotographic photosensitive member using the polyvinyl acetal resin is an electrophotographic photosensitive member which: causes a charge generation substance to exert its properties sufficiently; has high sensitivity; and shows high potential stability upon repeated use of the member. In addition, the electrophotographic photosensitive member can exert stable properties irrespective of a change in environment where the member is used and changes in specifications of a process cartridge or electrophotographic apparatus on which the member is mounted.

BEST MODE FOR CARRYING OUT THE INVENTION

Figure 1:
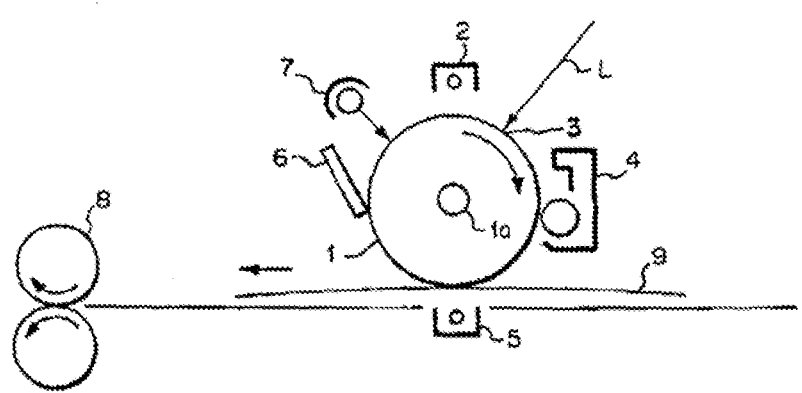
FIG. 1 is a view showing an example of the schematic constitution of an electrophotographic apparatus having an electrophotographic photosensitive member of the present invention.

Of the polyvinyl acetal resins, a butyral resin synthesized from butylaldehyde and polyvinyl alcohol is well known. An electron-donating, substituted triarylamine skeleton is introduced instead of an alkyl group into a polyvinyl acetal resin of the present invention.

The use of such resin as a binder resin for a photosensitive layer (charge generation layer) can improve the property with which a charge generation substance is dispersed. The inventors of the present invention consider that the use can improve, furthermore, the polarization of a carrier excited by the charge generation substance, the property with which charge is transported into the layer, and the property with which a carrier is injected into a charge transport layer and/or a base layer (layer between a support and the photosensitive layer). The inventors of the present invention assume that, as a result of the improvement, the sensitivity of an electrophotographic photosensitive member is improved, the residence of a carrier is suppressed, a photomemory is reduced, and potential stability and environmental property upon repeated use are improved.

The polyvinyl acetal resin of the present invention can be synthesized in the same manner as in an ordinary butyral resin. That is, the resin can be synthesized by causing polyvinyl alcohol and an aldehyde having an electron-donating, substituted triarylamine skeleton to react with each other in, for example, a mixed solvent of ethanol and toluene in the presence of an acid such as hydrochloric acid or sulfuric acid at 20 to 70° C.

The polyvinyl acetal resin of the present invention has a weight average molecular weight in the range of preferably 10,000 to 500,000, or more preferably 30,000 to 100,000.

When the molecular weight is excessively small, the dispersion stability of a charge generation substance, or film formability is insufficient in some cases. When the molecular weight is excessively large, a problem is apt to occur in handling upon synthesis, and the viscosity of the resin upon dispersion of a charge generation substance increases, with the result that the insufficient dispersion of the substance occurs in some cases.

In addition, the polyvinyl acetal resin of the present invention has a degree of acetalization of preferably 30 mol % or more, or more preferably 50 to 85 mol %. When the degree of acetalization is excessively low, the solubility of the resin in a solvent may reduce excessively. In addition, the number of electron-donating, substituted triarylamine skeletons reduces, so an effect of the present invention cannot be sufficiently obtained in some cases. On the other hand, it is difficult to synthesize a resin having a degree of acetalization in excess of 85 mol %.

In addition, in the present invention, the content of a remaining vinyl acetate component derived from polyvinyl alcohol as a raw material is preferably as low as possible. Polyvinyl alcohol having a degree of saponification of 85% or more is preferably used as a raw material. A degree of saponification of less than 85% is apt to reduce a degree of acetalization.

Examples of an electron-donating substituent include: alkyl groups such as a methyl group, an ethyl group, and a propyl group; alkoxy groups such as a methoxy group and an ethoxy group; a phenyl group; a phenoxy group; and a benzyl group.

When the polyvinyl acetal resin of the present invention is used in a photosensitive layer (charge generation layer) of an electrophotographic photosensitive member, the polyvinyl acetal resin of the present invention may be mixed with any other resin before use. The resins are mixed in such a manner that a ratio of the polyvinyl acetal resin of the present invention to the total mass of the resins is preferably 50 mass % or more, or more preferably 70 mass % or more.

Hereinafter, specific examples (Exemplified Resin (1) to (13)) of the polyvinyl acetal resin of the present invention are shown. The following $X^{11}$, $R^{11}$, $R^{12}$, $R^{13}$, $R^{14}$, $Ar^{11}$, and $Ar^{12}$ correspond to $X^{11}$, $R^{11}$, $R^{12}$, $R^{13}$, $R^{14}$, $Ar^{11}$, and $Ar^{12}$ in the general formula (1), respectively.

| | $X^{11}$ | $R^{11}$ | $R^{12}$ | $R^{13}$ | $R^{14}$ | $Ar^{11}$ | $Ar^{12}$ |
|---|---|---|---|---|---|---|---|
| Exemplified Resin (1) | —(CH$_2$)$_2$— | —H | —H | —H | —H | —C$_6$H$_4$—CH$_3$ | —C$_6$H$_4$—CH$_3$ |
| Exemplified Resin (2) | —(CH$_2$)$_2$— | —H | —H | —H | —H | —C$_6$H$_4$—CH$_3$ | —C$_6$H$_4$—OCH$_3$ |
| Exemplified Resin (3) | —(CH$_2$)$_2$— | —H | —H | —H | —H | —C$_6$H$_4$—CH$_3$ | —C$_6$H$_3$(CH$_3$)$_2$ |
| Exemplified Resin (4) | —(CH$_2$)$_2$— | —H | —H | —H | —H | —C$_6$H$_4$—CH$_3$ | —C$_6$H$_4$—CH$_2$CH$_3$ |

-continued

| | $X^{11}$ | $R^{11}$ | $R^{12}$ | $R^{13}$ | $R^{14}$ | $Ar^{11}$ | $Ar^{12}$ |
|---|---|---|---|---|---|---|---|
| Exemplified Resin (5) | —(CH$_2$)$_2$— | —H | —H | —H | —H | 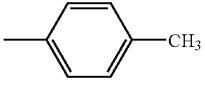 | 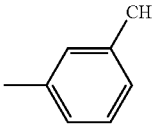 |
| Exemplified Resin (6) | —(CH$_2$)$_2$— | —H | —H | —H | —H | 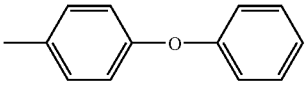 | 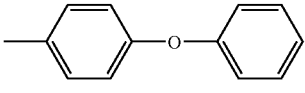 |
| Exemplified Resin (7) | —(CH$_2$)$_2$— | —H | —H | —H | —H | 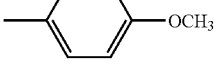 | 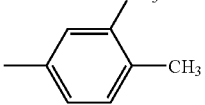 |
| Exemplified Resin (8) | —(CH$_2$)$_2$— | —H | —H | —H | —H | 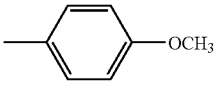 | 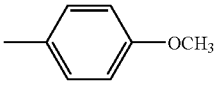 |
| Exemplified Resin (9) | —(CH$_2$)$_2$— | —H | —H | —H | —H | 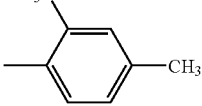 | 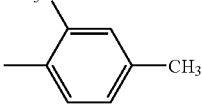 |
| Exemplified Resin (10) | —(CH$_2$)$_2$— | —H | —H | —H | —H | 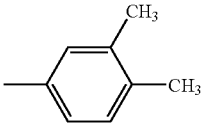 | 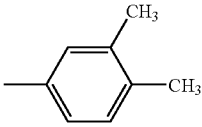 |
| Exemplified Resin (11) | —(CH$_2$)$_2$— | —CH$_3$ | —H | —H | —H | 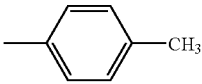 | 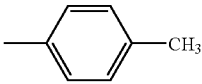 |
| Exemplified Resin (12) | —(CH$_2$)$_3$— | —H | —H | —H | —H | 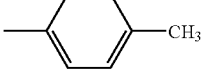 | 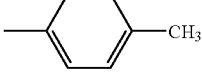 |
| Exemplified Resin (13) | —(CH$_2$)$_4$— | —H | —H | —H | —H | 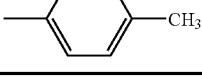 | 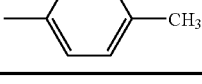 |

In the above general formula (1), $X^{11}$ preferably represents an ethylene group (unsubstituted ethylene group). In addition, all of $R^{11}$, $R^{12}$, $R^{13}$, and $R^{14}$ each preferably represent a hydrogen atom. In addition, the above electron-donating substituents possessed by $Ar^{11}$ and $Ar^{12}$ are each preferably any one of the alkyl groups; of the alkyl groups, a methyl group or an ethyl group is more preferable.

A photosensitive layer of an electrophotographic photosensitive member of the present invention may be a single-layer photosensitive layer obtained by incorporating a charge generation substance and a charge transport substance into a single layer, or may be a laminated photosensitive layer having a charge generation layer containing a charge generation substance and a charge transport layer containing a charge transport substance. From the viewpoints of electrophotographic properties, the photosensitive layer is preferably a laminated photosensitive layer. In addition, of the laminated photosensitive layers, an ordered photosensitive layer obtained by laminating a charge generation layer and a charge transport layer in the stated order from the side of a support is more preferable.

When the photosensitive layer is a laminated photosensitive layer, a charge generation layer can be formed by: applying a coating liquid for a charge generation layer prepared by dissolving the polyvinyl acetal resin of the present invention in a solvent and by adding and dispersing a charge generation substance to and in the solution; and drying the applied liquid. The charge generation substance can be dispersed by using any one of the dispersion machines such as: media type dispersion machines including a sand mill and a ball mill; and liquid collision type dispersion machines.

Examples of the charge generation substance include: azo pigments such as monoazo, bisazo and trisazo; phthalocyanine pigments such as metal phthalocyanine and non-metal phthalocyanine; indigo pigments such as indigo and thioindigo; perylene pigments such as perylenic acid anhydride and perylenic acid imide; polycyclic quinone-based pigments such as anthraquinone and pyrenequinone; a squarylium dye; a pyrylium salt; a thiopyrylium salt; and a triphenylmethane dye. Those charge generation substances may each be used alone, or two or more kinds of them may be used in combination.

Of the above charge generation substances, a gallium phthalocyanine crystal having strong peaks at Bragg angles in CuKα characteristic X-ray diffraction of 7.4°±0.3° and 28.2°±0.3° is preferable because a combination of the crystal and the polyvinyl acetal resin of the present invention provides excellent dispersion stability and excellent coating property. In addition, the combination of the gallium phthalocyanine crystal and the polyvinylacetal resin of the present invention exerts an improving effect on sensitivity and a suppressing effect on an increase in light potential upon repeated use at low humidity.

In addition, of the above charge generation substances, an oxytitanium phthalocyanine crystal having a strong peak at a Bragg angle in CuKα characteristic X-ray diffraction of 27.2°±0.3° is also preferable because a combination of the crystal and the polyvinyl acetal resin of the present invention provides excellent dispersion stability and excellent coating property. In addition, the combination of the oxytitanium phthalocyanine crystal and the polyvinyl acetal resin of the present invention exerts an improving effect on sensitivity and a reducing effect on a residual potential as initial effects, and a suppressing effect on a reduction in light potential (falling phenomenon) upon repeated use.

In addition, of the above charge generation substances, an azo compound represented by the following general formula (2) is also preferable because a combination of the compound and the polyvinyl acetal resin of the present invention provide excellent dispersion stability and excellent coating property:

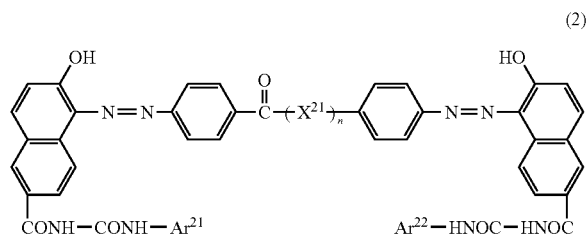

(2)

where $Ar^{21}$ and $Ar^{22}$ each independently represent a substituted or unsubstituted aryl group, $X^{21}$ represents a vinylene group or a p-phenylene group, and n represents 0 or 1. In addition, the combination of the azo compound and the polyvinyl acetal resin of the present invention exert improving effects on chargeability and sensitivity, and an alleviating effect on a photomemory so that potential stability upon repeated use is high.

When the photosensitive layer is a laminated photosensitive layer, a mass ratio between the charge generation substance in the charge generation layer and the polyvinyl acetal resin of the present invention (charge generation substance: polyvinyl acetal resin) is preferably 5:1 to 1:2, or more preferably 3:1 to 1:1. When the amount of the polyvinyl acetal resin is excessively small, an effect of the present invention cannot be sufficiently obtained in some cases. When the amount of the charge generation substance is excessively small, a charge generation function cannot be sufficiently obtained in some cases.

In addition, the charge generation layer has a thickness of preferably 5 μm or less, or more preferably 0.05 to 1 μm.

When the photosensitive layer is a laminated photosensitive layer, a charge transport layer can be formed by: applying a coating liquid for a charge transport layer prepared by dissolving a charge transport substance and a binder resin in a solvent; and drying the applied liquid.

Examples of the charge transport substance include triarylamine compounds, hydrazone compounds, stilbene compounds, pyrazoline compounds, oxazole compounds, thiazole compounds, and triallylmethane compounds.

In addition, examples of the binding resin to be used for the charge transport layer include a polyester resin, an acrylic resin, a polyvinylcarbazole resin, a phenoxy resin, a polycarbonate resin, a polyvinylbutyral resin, a polystyrene resin, a polyvinyl acetate resin, a polysulfone resin, a polyarylate resin, and a vinylidene chloride-acrylonitrile copolymer resin.

In addition, the charge transport layer has a thickness of preferably 5 to 40 μm, or more preferably 10 to 30 μm.

When the photosensitive layer is a single-layer photosensitive layer, the photosensitive layer can be formed by: applying a solution containing such charge generation substance and charge transport substance as described above, and the polyvinyl acetal resin of the present invention; and drying the applied liquid.

The single-layer photosensitive layer has a thickness of preferably 5 to 40 μm, or more preferably 15 to 30 μm.

A support to be used in the electrophotographic photosensitive member of the present invention has only to be one having conductivity (conductive support), and examples of a material for the support include aluminum, an aluminum alloy, copper, zinc, stainless steel, vanadium, molybdenum, chromium, titanium, nickel, indium, gold, and platinum. A support formed by coating the upper portion of a plastic (such as polyethylene, polypropylene, polyvinyl chloride, polyethylene terephthalate, or an acrylic resin) with such metal or alloy by a vacuum deposition method is also permitted. A support obtained by coating the upper portion of a substrate made of a plastic, a metal, or an alloy with conductive particles (such as carbon black and silver particles) together with a binder resin is also permitted. A support obtained by impregnating a plastic or paper with conductive particles is also permitted. Examples of the shape of the support include a drum shape, a sheet shape, and a belt shape. The support is preferably of a shape optimum for an electrophotographic apparatus to which the support is applied.

In the electrophotographic photosensitive member of the present invention, a base layer (intermediate layer) having a function such as a barrier function or an adhesion function may be provided for a gap between the support and the photosensitive layer. The base layer can be formed of, for example, casein, polyvinyl alcohol, nitrocellulose, polyamide (such as nylon 6, nylon 66, nylon 610, copolymerized nylon, or alkoxymethylated nylon), polyurethane, or aluminum oxide.

The base layer has a thickness of preferably 5 μm or less, or more preferably 0.3 to 2 μm.

In addition, a protective layer may be provided on the photosensitive layer for the purposes of protecting the photosensitive layer and improving the durability of the electrophotographic photosensitive member.

The protective layer can be formed by: applying, onto the photosensitive layer, a coating liquid for a protective layer prepared by dissolving a resin such as polyvinyl butyral, polyester, polycarbonate (such as polycarbonate Z or denatured polycarbonate), polyamide, polyimide, polyarylate, polyurethane, a styrene-butadiene copolymer, a styrene-acrylic acid copolymer, or a styrene-acrylonitrile copolymer in a solvent; and drying the applied liquid. Alternatively, the protective layer can be formed by: applying the coating liquid for a protective layer onto the photosensitive layer; and curing the liquid by heating the liquid or by irradiating the liquid with, for example, an electron beam or ultraviolet light.

The protective layer has a thickness of preferably 0.1 to 10 μm.

In addition, conductive particles, a UV absorber, lubricant particles such as fluorine atom-containing resin particles, and the like may be incorporated into the protective layer. Preferable examples of the conductive particles include metal oxide particles made of tin oxide, silica, or the like.

The electrophotographic photosensitive member of the present invention can find use in a wide variety of applications including electrophotographic copying machines, laser beam printers, CRT printers, and electrophotographic plate making systems.

Next, an electrophotographic apparatus having the electrophotographic photosensitive member of the present invention will be described.

FIG. 1 shows an example of the schematic constitution of the electrophotographic apparatus of the present invention.

In FIG. 1, reference numeral 1 represents a drum type electrophotographic photosensitive member of the present invention which rotates around an axis 1a in the direction indicated by an arrow at a predetermined circumferential speed. The circumferential surface of the electrophotographic photosensitive member 1 is charged by a charging means 2 to have a positive or negative predetermined electric potential in the course of the rotation. Next, at an exposure portion 3, the member receives exposure light L (such as laser beam scanning exposure) from an exposing means (not shown). As a result, electrostatic latent images corresponding to exposure images are sequentially formed on the circumferential surface of the electrophotographic photosensitive member. The electrostatic latent images are then developed as toner images by a developing means 4, and the toner images are sequentially transferred by a transfer means 5 according to a corona mode (corona transfer means) onto the surface of a transfer material 9 fed in synchronization with the rotation of the electrophotographic photosensitive member 1 from a sheet-feeding portion (not shown) to a space between the electrophotographic photosensitive member 1 and the transfer means 5. The transfer material 9 onto which the toner images have been transferred is separated from the circumferential surface of the electrophotographic photosensitive member and introduced into a fixing means 8 where the images are fixed. As a result, the transfer material is printed out as a copy to the outside of the electrophotographic apparatus. Transfer residual toner on the circumferential surface of the electrophotographic photosensitive member 1 after the transfer of the toner images is removed by a cleaning means 6 so that the surface is cleaned. Then, the surface is subjected to an antistatic treatment by a pre-exposing means 7 so that the member is repeatedly used for image formation.

Figure 2:
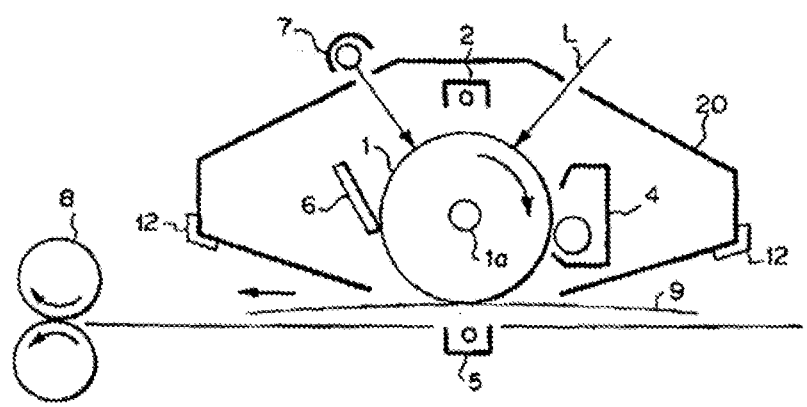
FIG. 2 is a view snowing an example of the schematic constitution of an electrophotographic apparatus provided with a process cartridge having the electrophotographic photosensitive member of the present invention.

Alternatively, as shown in FIG. 2, a process cartridge may be constituted, which: integrally supports an electrophotographic photosensitive member and at least one means selected from the group consisting of a charging means, a developing means, a transfer means, and a cleaning means; and is detachably mountable in an electrophotographic apparatus main body.

The process cartridge shown in FIG. 2 is obtained by storing the electrophotographic photosensitive member 1, the charging means 2, and the developing means 4 in a container 20. The process cartridge is constituted so as to be detachably mountable in the electrophotographic apparatus main body by a guiding means 12 such as a rail. The cleaning means 6 may be, or may not be, placed in the container 20.

Figure 3:
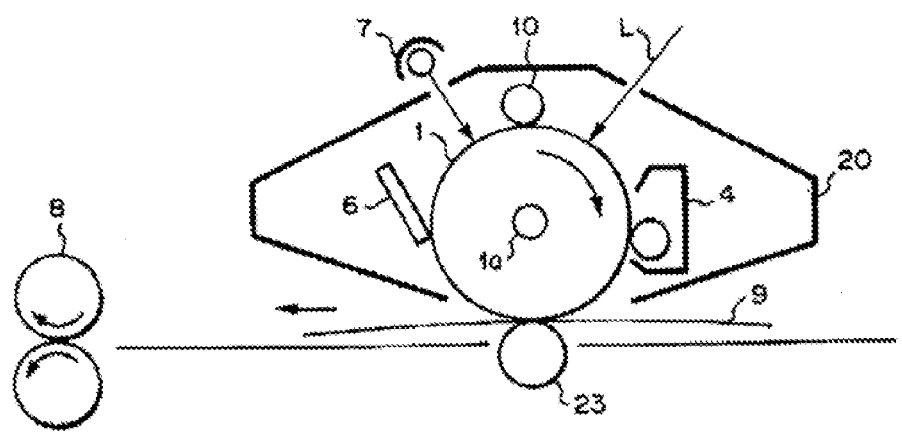
FIG. 3 is a view showing an example of the schematic constitution of the electrophotographic apparatus provided with the process cartridge having the electrophotographic photosensitive member of the present invention.

FIG. 3 shows another form of each of the process cartridge and electrophotographic apparatus of the present invention. As shown in FIG. 3, each of the process cartridge and electrophotographic apparatus of the present invention may charge the electrophotographic photosensitive member 1 with the aid of a contact charging member 10 as a charging means by bringing the contact charging member 10 to which a voltage has been applied into contact with the electrophotographic photosensitive member 1 (the charging method is hereinafter referred to as "contact charging"). In the apparatus shown in FIG. 3, a toner image on the electrophotographic photosensitive member 1 is also transferred onto the transfer material 9 by a contact charging member 23 for transfer. That is, the toner image on the electrophotographic photosensitive member 1 is transferred onto the transfer material 9 by bringing the contact charging member 23 for transfer to which a voltage has been applied into contact with the transfer material 9.

Figure 4:
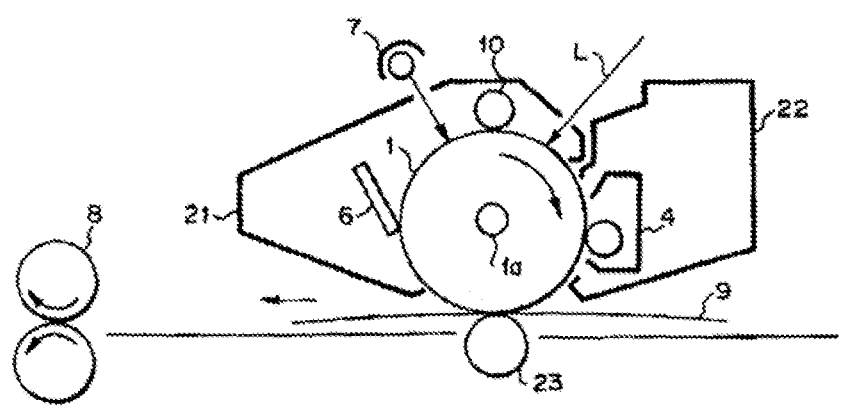
FIG. 4 is a view showing an example of the schematic constitution of the electrophotographic apparatus provided with the process cartridge having the electrophotographic photosensitive member of the present invention.

Further, as shown in FIG. 4, the process cartridge and the electrophotographic apparatus may be constituted as follows: the electrophotographic photosensitive member 1 and the contact charging member 10 are stored in a first container 21 to provide a first process cartridge, and the developing means 4 is stored in a second container 22 to provide a second process cartridge.

When the electrophotographic apparatus is used as a copying machine or a printer, light reflected from a manuscript or light that has transmitted through the manuscript may be used as the exposure light L, or a laser beam used in scanning in accordance with a signal obtained by reading the manuscript and turning the read manuscript into the signal may be used. Alternatively, the driving of a light-emitting diode array, the driving of a liquid crystal shutter array, or the like may be adopted.

Hereinafter, the present invention will be described in more detail by way of examples. It should be noted that the term "part(s)" in the following examples represents "part(s) by mass".

Infrared spectroscopy (IR) was performed by using an FT/IR-420 (manufactured by JASCO Corporation).

The X-ray diffraction of a crystal form was performed by using a CuKα ray under the following conditions.

| | |
|---|---|
| Measuring machine used: | fully automatic X-ray diffractometer MXP 18 manufactured by Mac Science |
| X-ray tube: | Cu |
| Tube voltage: | 50 kV |
| Tube current: | 300 mA |
| Scan method: | 2θ/θ scan |
| Scanning speed: | 2 deg./min |
| Sampling interval: | 0.020 deg. |
| Start angle (2θ): | 5 deg. |
| Stop angle (2θ): | 40 deg. |
| Divergence slit: | 0.5 deg. |
| Scattering slit: | 0.5 deg. |
| Receiving slit: | 0.3 deg. |
| A bent monochromator was used | |

SYNTHESIS EXAMPLE 1

Synthesis of Exemplified Resin (1)

3 parts of polyvinyl alcohol (trade name: POVAL 1400, manufactured by Kishida Chemical Co., Ltd.) and 54 parts of an aldehyde compound represented by the following structural formula were stirred in 25 parts of toluene and 25 parts of ethanol, and 0.2 part of concentrated hydrochloric acid was dropped to the mixture.

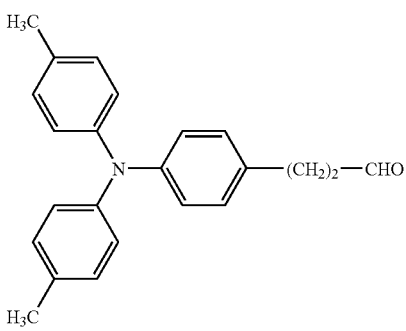

Then, the temperature of the resultant was increased to 50° C., and the resultant was stirred for 5 hours under heat. The reactant was dropped to 1,000 parts of methanol, in which 0.4 part of sodium hydroxide had been dissolved, under stirring, and then the precipitate was separated by filtration. The resultant remainder on the filter paper was dissolved in 100 parts of toluene and 100 parts of acetone, and the insoluble matter was removed by using fluted filter paper. After that, the remainder was dropped to 2,000 parts of methanol under stirring, and the precipitate was separated by filtration. The resultant remainder on the filter paper was redissolved in 180 parts of a mixed solution of toluene and acetone at a ratio of 1:1, and then the solution was dropped to 2,000 parts of methanol under stirring. The precipitate was separated by filtration, whereby 1.4 parts of Exemplified Resin (1) were obtained. IR data on the resultant resin is shown below.

IR (cm$^{-1}$, KBr): 3,525, 3,025, 2,919, 2,859, 1,607, 1,507, 1,319, 1,272, 1,138, 1,056, 814, 714

SYNTHESIS EXAMPLE 2

Synthesis of Exemplified Resin (3)

1.8 parts of polyvinyl alcohol (tradename: POVAL 1400, manufactured by Kishida Chemical Co., Ltd.) and 34 parts of an aldehyde compound represented by the following structural formula were stirred in 25 parts of toluene and 25 parts of ethanol, and 0.2 part of concentrated hydrochloric acid was dropped to the mixture.

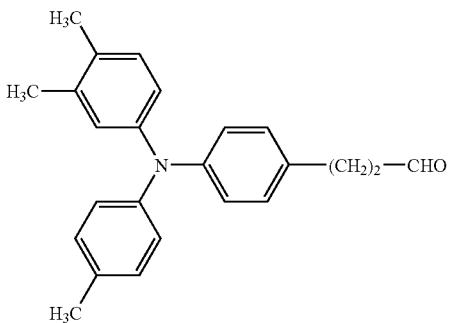

Then, the temperature of the resultant was increased to 50° C., and the resultant was stirred for 5 hours under heat. The reactant was dropped to 1,000 parts of methanol, in which 0.3 part of sodium hydroxide had been dissolved, under stirring, and then the precipitate was separated by filtration. The resultant remainder on the filter paper was dissolved in 90 parts of toluene and 90 parts of acetone, and the insoluble matter was removed by using fluted filter paper. After that, the remainder was dropped to 2,000 parts of methanol under stirring, and the precipitate was separated by filtration. The resultant remainder on the filter paper was redissolved in 50 parts of toluene and 30 parts of acetone, and then the solution was dropped to 2,000 parts of methanol under stirring. The precipitate was separated by filtration, whereby 1.6 parts of Exemplified Resin (3) were obtained. IR data on the resultant resin is shown below.

IR (cm$^{-1}$, KBr): 3,510, 2,919, 2,859, 1,606, 1,508, 1,321, 1,273, 1,135, 1,045, 814, 600

SYNTHESIS EXAMPLE 3

Synthesis of Exemplified Resin (7)

1.7 parts of polyvinyl alcohol (trade name: POVAL 1400, manufactured by Kishida Chemical Co., Ltd.) and 33 parts of an aldehyde compound represented by the following structural formula were stirred in 25 parts of toluene and 25 parts of ethanol, and 0.2 part of concentrated hydrochloric acid was dropped to the mixture.

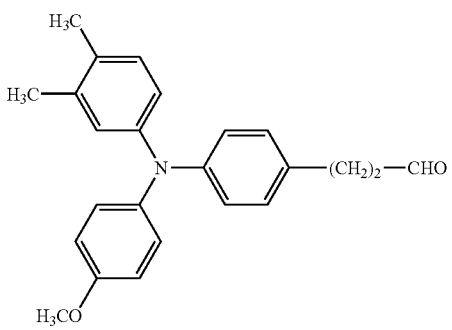

Then, the temperature of the resultant was increased to 50° C., and the resultant was stirred for 8 hours under heat. The reactant was dropped to 1,000 parts of methanol, in which 0.3 part of sodium hydroxide had been dissolved, under stirring, and then the precipitate was separated by filtration. The resultant remainder on the filter paper was dissolved in 100 parts of toluene and 100 parts of acetone, and the insoluble matter was removed by using fluted filter paper. After that, the remainder was dropped to 2,000 parts of methanol under stirring, and the precipitate was separated by filtration. The resultant remainder on the filter paper was redissolved in 80 parts of toluene and 80 parts of acetone, and then the solution was dropped to 2,000 parts of methanol under stirring. The precipitate was separated by filtration, whereby 4.4 parts of Exemplified Resin (7) were obtained. IR data on the resultant resin is shown below.

IR (cm$^{-1}$, KBr): 3,504, 2, 936, 2,860, 1,606, 1,505, 1,321, 1,270, 1,241, 1,136, 1,037, 823, 601

SYNTHESIS EXAMPLE 4

Synthesis of Exemplified Resin (10)

3.4 parts of polyvinyl alcohol (trade name: POVAL 1400, manufactured by Kishida Chemical Co., Ltd.) and 70 parts of an aldehyde compound represented by the following structural formula were stirred in 80 parts of toluene and 80 parts of ethanol, and 0.2 part of concentrated hydrochloric acid was dropped to the mixture.

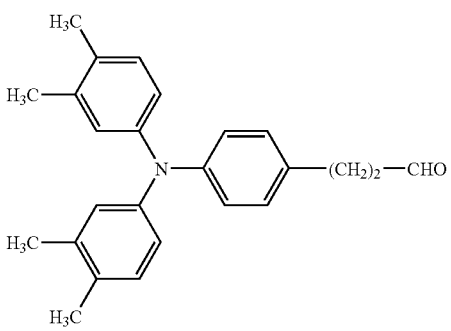

Then, the temperature of the resultant was increased to 50° C., and the resultant was stirred for 6 hours under heat. The reactant was dropped to 1,500 parts of methanol, in which 0.3 part of sodium hydroxide had been dissolved, under stirring, and then the precipitate was separated by filtration. The resultant remainder on the filter paper was dissolved in 150 parts of toluene and 150 parts of acetone, and the insoluble matter was removed by using sellite filtration. After that, the remainder was dropped to 2,000 parts of methanol under stirring, and the precipitate was separated by filtration. The resultant remainder on the filter paper was redissolved in 100 parts of toluene and 100 parts of acetone, and then the solution was dropped to 2,000 parts of methanol under stirring. The precipitate was separated by filtration, whereby 2.5 parts of Exemplified Resin (10) were obtained. IR data on the resultant resin is shown below.

IR (cm$^{-1}$, KBr): 3,466, 2,941, 1,606, 1,508, 1,499, 1,314, 1,272, 1,135, 1,048

COMPARATIVE SYNTHESIS EXAMPLE 1

Synthesis of Comparative Resin (A)

2.7 parts of polyvinyl alcohol (tradename: POVAL 1400, manufactured by Kishida Chemical Co., Ltd.) and 46 parts of an aldehyde compound represented by the following structural formula were stirred in 35 parts of toluene and 35 parts of ethanol, and 0.4 part of concentrated hydrochloric acid was dropped to the mixture.

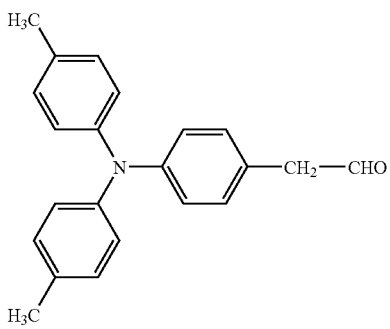

Then, the temperature of the resultant was increased to 50° C., and the resultant was stirred for 6 hours under heat. The reactant was dropped to 1,000 parts of methanol, in which 0.4 part of sodium hydroxide had been dissolved, under stirring, and then the precipitate was separated by filtration. The resultant remainder on the filter paper was dissolved in 50 parts of toluene and 50 parts of acetone, and the insoluble matter was removed by using fluted filter paper. After that, the remainder was dropped to 2,000 parts of methanol under stirring, and the precipitate was separated by filtration. The resultant remainder on the filter paper was redissolved in 50 parts of toluene and 50 parts of acetone, and then the solution was dropped to 2,000 parts of methanol under stirring. The precipitate was separated by filtration, whereby 1.0 part of Comparative Resin (A) as a polyvinyl acetal resin having a repeating structural unit represented by the following structural formula was obtained.

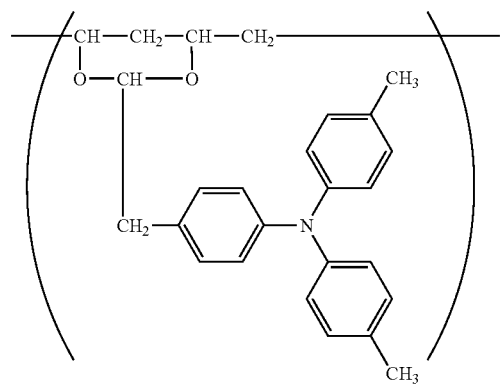

IR data on the resultant resin is shown below.

IR (cm$^{-1}$, KBr): 3,461, 3,026, 2,919, 1,606, 1,506, 1,320, 1,273, 814

COMPARATIVE SYNTHESIS EXAMPLE 2

Synthesis of Comparative Resin (B)

4.4 parts of polyvinyl alcohol (tradename: POVAL 1400, manufactured by Kishida Chemical Co., Ltd.) and 75 parts of an aldehyde compound represented by the following structural formula were stirred in 100 parts of toluene and 100 parts of ethanol, and 0.3 part of concentrated hydrochloric acid was dropped to the mixture.

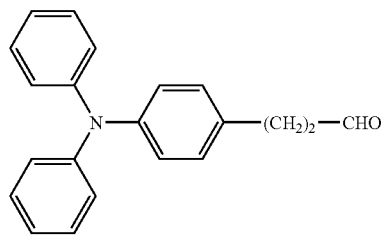

Then, the temperature of the resultant was increased to 50° C., and the resultant was stirred for 7 hours under heat. The reactant was dropped to 1,000 parts of methanol, in which 0.3 part of sodium hydroxide had been dissolved, under stirring, and then the precipitate was separated by filtration. The resultant remainder on the filter paper was dissolved in 150 parts of toluene and 150 parts of acetone, and the insoluble matter was removed by using sellite filtration. After that, the remainder was dropped to 2,000 parts of methanol under stirring, and the precipitate was separated by filtration. The resultant remainder on the filter paper was redissolved in 200 parts of toluene and 100 parts of acetone, and then the solution was dropped to 2,000 parts of methanol under stirring. The precipitate was separated by filtration, whereby 9.1 part of Comparative Resin (B) as a polyvinyl acetal resin having a repeating structural unit represented by the following structural formula was obtained.

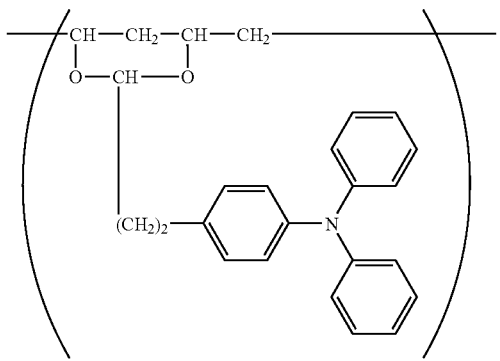

IR data on the resultant resin is shown below.

IR (cm$^{-1}$, KBr): 3,466, 3,033, 2,943, 1,587, 1,509, 1,491, 1,272, 1,131, 830, 750, 693, 620

EXAMPLE 1

An aluminum cylinder having a diameter of 30 mm and a length of 357.5 mm was used as a support.

The upper portion of the support was immersed in and coated with a coating liquid constituted of the following materials, and the resultant was dried for 30 minutes at 140° C., whereby a conductive layer (interference fringe preventing layer) having a thickness of 18 μm was formed.

| | |
|---|---|
| Conductive pigment: | 10 parts of barium sulfate coated with SnO$_2$ |
| Pigment for adjusting resistance: | 2 parts of titanium oxide |
| Binder resin: | 6 parts of phenol resin |
| Leveling Agent: | 0.001 part of silicone oil |
| Solvent: | 15 parts of a mixed solvent of methanol and methoxypropanol at a ratio of 0.2:0.8 |

Next, 1 part of N-methoxymethylated nylon and 3 parts of copolymerized nylon were dissolved in a mixed solvent of 60 parts of methanol and 30 parts of n-butanol, whereby a coating liquid for a base layer (intermediate layer) was prepared.

The upper portion of the conductive layer was immersed in and coated with the coating liquid for a base layer (intermediate layer), and the resultant was dried for 10 minutes at 100° C., whereby a base layer (intermediate layer) having a thickness of 0.6 μm was formed.

Next, 10 parts of a hydroxygallium phthalocyanine crystal (charge generation substance) having a strong peak at a Bragg angle 2θ±0.2° in CuKα characteristic X-ray diffraction of each of 7.5° and 28.3°, 5 parts of Exemplified Resin (1) obtained in the Synthesis Example 1, and 200 parts of cyclohexanone were dispersed for 6 hours with a sand mill device using glass beads each having a diameter of 0.8 mm. After that, 170 parts of cyclohexanone and 380 parts of ethyl acetate were added to the mixture, whereby a coating liquid for a charge generation layer was prepared.

The upper portion of the base layer (intermediate layer) was immersed in and coated with the coating liquid for a charge generation layer, and the resultant was dried for 10 minutes at 80° C., whereby a charge generation layer having a thickness of 0.18 μm was formed.

Next, 10 parts of a compound represented by the following structural formula (CTM-1) (charge transport substance) and 10 parts of a polycarbonate resin (trade name: Lupilon Z-200, manufactured by Mitsubishi Engineering-Plastics Corporation) were dissolved in a mixed solvent of 90 parts of monochlorobenzene and 20 parts of dichloromethane, whereby a coating liquid for a charge transport layer was prepared.

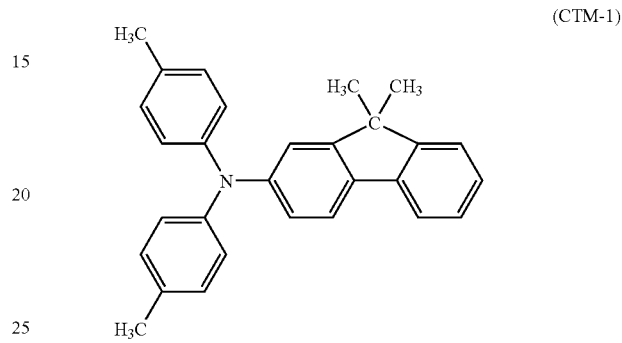

(CTM-1)

The upper portion of the charge generation layer was immersed in and coated with the coating liquid for a charge transport layer, and the resultant was dried for 60 minutes at 110° C., whereby a charge transport layer having a thickness of 20 μm was formed.

Thus, the electrophotographic photosensitive member 1 was produced.

(Evaluation for Photosensitive Property)

The photosensitive property of the electrophotographic photosensitive member 1 was measured by using an electrophotographic photosensitive member measuring device according to a direct voltage application mode using bent NESA glass. A measurement sequence was a sequence for a capacitor model in which the electrophotographic photosensitive member was regarded as a capacitor.

Figure 5:
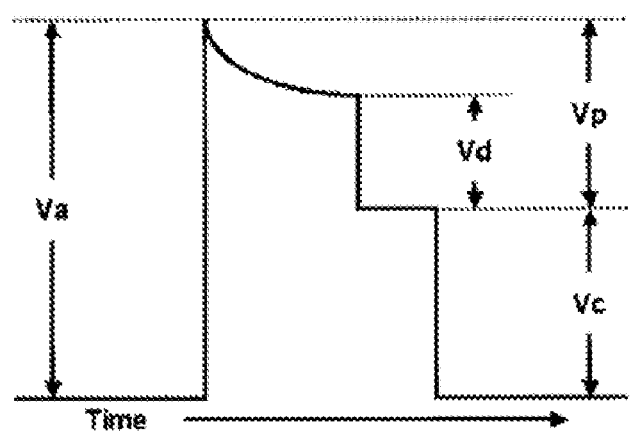
FIG. 5 is a view concerning the evaluation of an electrophotographic photosensitive member for sensitivity and residual potential.

The measurement is advanced as shown in FIG. 5.

To be specific, first, in order that the hysteresis of the electrophotographic photosensitive member might be eliminated, the electrophotographic photosensitive member was irradiated with exposure light (image exposure light) and pre-exposure light, and, 10 milliseconds after the irradiation, a predetermined applied voltage (Va) was applied to the electrophotographic photosensitive member. Next, 20 milliseconds after the application, the electric potential (Vd+Vc) of the member was measured. After the measurement, the electric potential of the electrophotographic photosensitive member was grounded. Next, an electric potential (Vc) allotted to a capacitor inserted into a measuring instrument was measured. A surface potential (Vd) determined from those results was defined as the electric potential of the electrophotographic photosensitive member.

It should be noted that, 20 milliseconds after the surface potential (Vd) had reached −700 V, light obtained by dispersing halogen light with an interference filter capable of extracting light having a wavelength (image exposure wavelength) of 403 nm was applied for 100 milliseconds, and, 395 milliseconds after the application, the surface potential was measured. Photosensitivity (Δ500) was determined from a light quantity (cJ/m$^2$) at which the surface potential (Vd) reached −200V owing to exposure (image exposure). In addition a surface potential 500 milliseconds after the application of halogen light (pre-exposure light) with 1,600 Lux for 100 milliseconds was defined as a residual potential.

(Evaluation for Photomemory Property)

The dark potential (VD) of the electrophotographic photosensitive member was set to −700 V, and the light potential (VL) of the member with light obtained as a result of dispersion with an interference filter capable of extracting light having a wavelength of 403 nm was set to −200 V. Next, part of the electrophotographic photosensitive member was irradiated with light from a fluorescent lamp with 1,500 Lux for 5 minutes, and then the member was left in a dark place for 3 minutes. After that, the dark potential (VD) and light potential (VL) of the electrophotographic photosensitive member were measured again, and a difference in VD (ΔVDPM) between a non-irradiated portion and an irradiated portion and a difference in VL (ΔVLPM) between the non-irradiated portion and the irradiated portion were each measured as a photomemory.

(Evaluation for Coating Property)

A coating liquid for a charge generation layer prepared in each of examples and comparative examples was evaluated for coating property by visually evaluating the external appearance of a surface coated with the liquid.

(Evaluation for Dispersion Stability)

The particle size of a charge generation substance in an initial coating liquid for a charge generation layer prepared in each of examples and comparative examples was measured with a centrifugal sedimentation type grain size distribution measuring device CAPA-700 (manufactured by HORIBA, Ltd.). After that, the coating liquid was stationary stored for 3 months. Then, the coating liquid was visually evaluated for dispersed state, and the particle size of the charge generation substance was similarly measured and evaluated.

Table 1 shows the above results.

(Actual Machine Evaluation)

The electrophotographic photosensitive member 1 was evaluated for durable electric potential property by using a reconstructed device of a copying machine GP-40 manufactured by Canon Inc. (obtained by: changing a light source to semiconductor laser (blue laser) having a wavelength of 405 nm; and changing pre-exposure to a halogen lamp). An electric potential was measured by: removing a developing unit from the main body of the copying machine; and fixing a probe for measuring an electric potential at a developing position instead of the developing unit. At that time, a transfer unit was out of contact with the electrophotographic photosensitive member, and no paper was passed.

Charging setting was performed and an image exposure value was adjusted in such a manner that the dark potential (VD) would be −700 V and the light potential (VL) would be −200 V under a normal-temperature, normal-humidity environment (N/N) having a temperature of 23° C. and a humidity of 50% RH. In addition, a pre-exposure value was adjusted so as to be twice as large as the halogen light quantity at which a surface potential of −700 V was attenuated to −200 V. After that, VL duration involving 2,000 consecutive rotations (meaning a durability test in a full-screen black image mode) was performed, and a light potential at the 2,000-th rotation was measured. A difference between an initial VL and a VL at the 2,000-th rotation was defined as a "variation after 2,000 times of duration".

In addition, the electrophotographic photosensitive member 1 was left together with an evaluation machine under a normal-temperature, low-humidity environment (N/L) having a temperature of 23° C. and a humidity of 5% RH for 3 days. After that, charging setting was performed and an image exposure value was adjusted in such a manner that the dark potential (VD) would be −700 V and the light potential (VL) would be −200 V under the same environment (N/L). In addition, a pre-exposure value was adjusted so as to be twice as large as the halogen light quantity at which a surface potential of −700 V was attenuated to −200 V. After that, VL duration involving 2,000 consecutive rotations was performed, and a light potential at the 2,000-th rotation was measured. A difference between an initial VL and a VL at the 2,000-th rotation was defined as a "variation after 2,000 times of duration".

In addition, the electrophotographic photosensitive member 1 was left together with an evaluation machine under a high-temperature, high-humidity environment (H/H) having a temperature of 30° C. and a humidity of 80% RH for 3 days. After that, charging setting was performed and an image exposure value was adjusted in such a manner that the dark potential (VD) would be −700 V and the light potential (VL) would be −200 V under the same environment (H/H). In addition, a pre-exposure value was adjusted so as to be twice as large as the halogen light quantity at which a surface potential of −700 V was attenuated to −200 V. After that, VL duration involving 2,000 consecutive rotations was performed, and a light potential at the 2,000-th rotation was measured. A difference between an initial VL and a VL at the 2,000-th rotation was defined as a "variation after 2,000 times of duration".

Table 2 shows the above results.

EXAMPLE 2

An electrophotographic photosensitive member 2 was produced in the same manner as in Example 1 except that Exemplified Resin (1) used in the charge generation layer in Example 1 was changed to Exemplified Resin (3) obtained in the Synthesis Example 2, and the member was evaluated in the same manner as in Example 1.

Tables 1 and 2 show the results.

EXAMPLE 3

An electrophotographic photosensitive member 3 was produced in the same manner as in Example 1 except that Exemplified Resin (1) used in the charge generation layer in Example 1 was changed to Exemplified Resin (7) obtained in the Synthesis Example 3, and the member was evaluated in the same manner as in Example 1.

Tables 1 and 2 show the results.

EXAMPLE 4

An electrophotographic photosensitive member 4 was produced in the same manner as in Example 1 except that Exemplified Resin (1) used in the charge generation layer in Example 1 was changed to Exemplified Resin (10) obtained in the Synthesis Example 4, and the member was evaluated in the same manner as in Example 1.

Tables 1 and 2 show the results.

EXAMPLE 11

An electrophotographic photosensitive member 11 was produced in the same manner as in Example 1 except that the hydroxygallium phthalocyanine crystal having a strong peak at a Bragg angle 2θ±0.2° in CuKα characteristic X-ray diffraction of each of 7.5° and 28.3° used in the charge generation layer in Example 1 was changed to an oxytitanium phthalocyanine crystal having a strong peak at a Bragg angle 2θ±0.2° in CuKα characteristic X-ray diffraction of each of 9.0° and 27.1°, and the member was evaluated in the same manner as in Example 1.

Tables 1 and 2 show the results.

EXAMPLE 21

A conductive layer (interference fringe preventing layer) and a base layer (intermediate layer) were formed on a support (aluminum cylinder) in the same manner as in Example 1.

Next, 10 parts of an azo compound (charge generation substance) represented by the following structural formula (CGM-1) and 200 parts of cyclohexanone were dispersed for 20 hours with a sand mill device using 300 parts of glass beads each having a diameter of 0.8 mm.

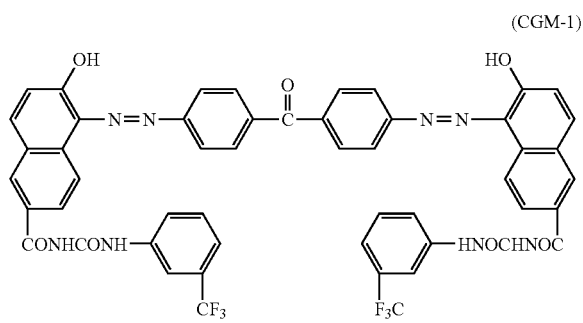

(CGM-1)

After that, a solution prepared by dissolving 5 parts of Exemplified Resin (1) obtained in the Synthesis Example 1 in 50 parts of cyclohexanone was added to the mixture. Then, the resultant was dispersed with the sand mill device for an additional 3 hours. After that, 150 parts of cyclohexanone and 350 parts of 2-butanone were added to the resultant, whereby a coating liquid for a charge generation layer was prepared.

The upper portion of the base layer (intermediate layer) was immersed in and coated with the coating liquid for a charge generation layer, and the resultant was dried for 10 minutes at 80° C., whereby a charge generation layer having a thickness of 0.20 μm was formed.

Next, a charge transport layer was formed on the charge generation layer in the same manner as in Example 1.

Thus, an electrophotographic photosensitive member 21 was produced.

The resultant electrophotographic photosensitive member 21 was evaluated in the same manner as in Example 1.

Tables 1 and 2 show the results.

EXAMPLE 22

An electrophotographic photosensitive member 22 was produced in the same manner as in Example 21 except that Exemplified Resin (1) used in the charge generation layer in Example 21 was changed to Exemplified Resin (3) obtained in the Synthesis Example 2, and the member was evaluated in the same manner as in Example 1.

Tables 1 and 2 show the results.

EXAMPLE 23

An electrophotographic photosensitive member 23 was produced in the same manner as in Example 21 except that Exemplified Resin (1) used in the charge generation layer in Example 21 was changed to Exemplified Resin (7) obtained in the Synthesis Example 3, and the member was evaluated in the same manner as in Example 1.

Tables 1 and 2 show the results.

EXAMPLE 24

An electrophotographic photosensitive member 24 was produced in the same manner as in Example 21 except that Exemplified Resin (1) used in the charge generation layer in Example 21 was changed to Exemplified Resin (10) obtained in the Synthesis Example 4, and the member was evaluated in the same manner as in Example 1.

Tables 1 and 2 show the results.

EXAMPLE 31

An electrophotographic photosensitive member 31 was produced in the same manner as in Example 21 except that the azo compound represented by the above structural formula (CGM-1) used in the charge generation layer in Example 21 was changed to a mixture of 4 kinds of azo compounds, that is, an azo compound represented by the following structural formula (CGM-2), an azo compound represented by the following structural formula (CGM-3), an azo compound represented by the following structural formula (CGM-4), and an azo compound represented by the following structural formula (CGM-5), and the member was evaluated in the same manner as in Example 1.

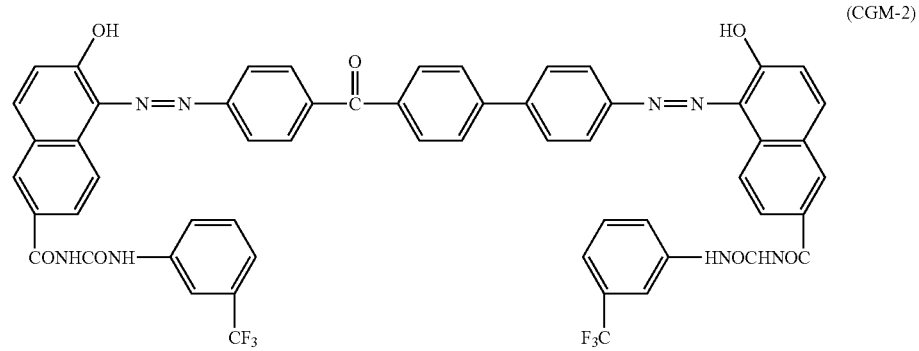

(CGM-2)

-continued

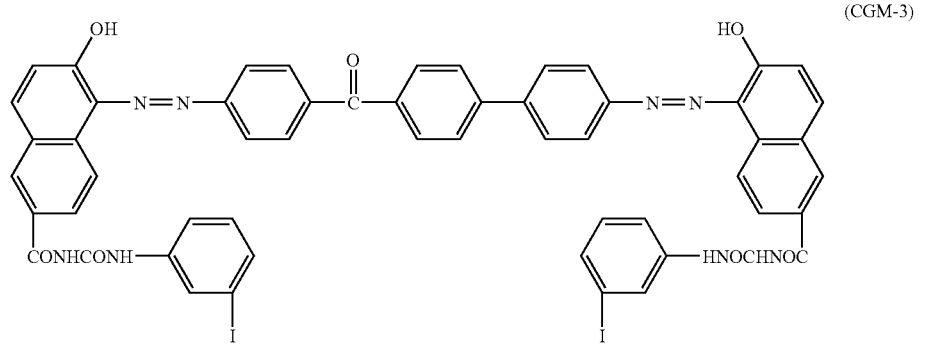

(CGM-3)

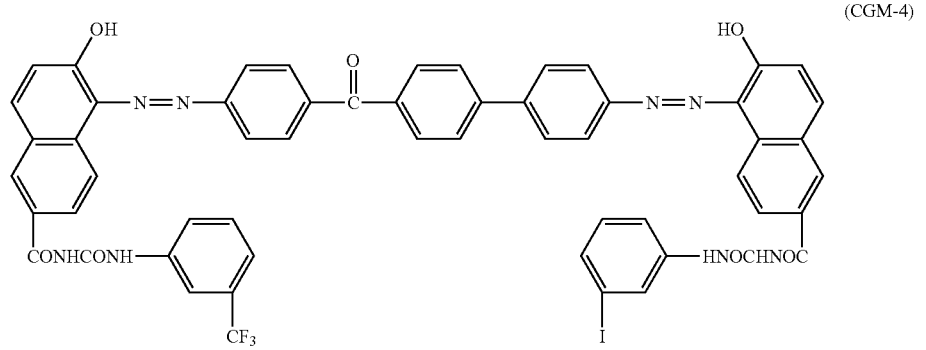

(CGM-4)

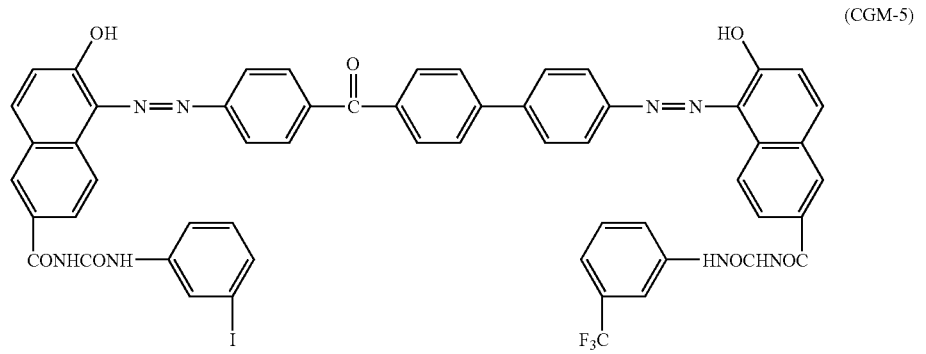

(CGM-5)

EXAMPLE 32

An electrophotographic photosensitive member 32 was produced in the same manner as in Example 31 except that Exemplified Resin (1) used in the charge generation layer in Example 31 was changed to Exemplified Resin (3) obtained in the Synthesis Example 2, and the member was evaluated in the same manner as in Example 1.

Tables 1 and 2 show the results.

EXAMPLE 33

An electrophotographic photosensitive member 33 was produced in the same manner as in Example 31 except that Exemplified Resin (1) used in the charge generation layer in Example 31 was changed to Exemplified Resin (7) obtained in the Synthesis Example 3, and the member was evaluated in the same manner as in Example 1.

Tables 1 and 2 show the results.

EXAMPLE 34

An electrophotographic photosensitive member 34 was produced in the same manner as in Example 31 except that Exemplified Resin (1) used in the charge generation layer in Example 31 was changed to Exemplified Resin (10) obtained in the Synthesis Example 4, and the member was evaluated in the same manner as in Example 1.

Tables 1 and 2 show the results.

COMPARATIVE EXAMPLE 1

A comparative electrophotographic photosensitive member 1 was produced in the same manner as in Example 1 except that Exemplified Resin (1) used in the charge generation layer in Example 1 was changed to a polyvinyl butyral resin (trade name: S-REC BX-1, manufactured by SEKISUI CHEMICAL CO., LTD.), and the member was evaluated in the same manner as in Example 1.

Tables 1 and 2 show the results.

COMPARATIVE EXAMPLE 2

An comparative electrophotographic photosensitive member 2 was produced in the same manner as in Example 1 except that Exemplified Resin (1) used in the charge generation layer in Example 1 was changed to Comparative Resin (A) obtained in the Comparative Synthesis Example 1, and the member was evaluated in the same manner as in Example 1.

Tables 1 and 2 show the results.

COMPARATIVE EXAMPLE 3

An comparative electrophotographic photosensitive member 3 was produced in the same manner as in Example 1 except that Exemplified Resin (1) used in the charge generation layer in Example 1 was changed to Comparative Resin (B) obtained in the Comparative Synthesis Example 2, and the member was evaluated in the same manner as in Example 1.

Tables 1 and 2 show the results.

COMPARATIVE EXAMPLE 4

A comparative electrophotographic photosensitive member 4 was produced in the same manner as in Example 1 except that Exemplified Resin (1) used in the charge generation layer in Example 1 was changed to Comparative Resin (C) having a repeating structural unit represented by the following structural formula, and the member was evaluated in the same manner as in Example 1.

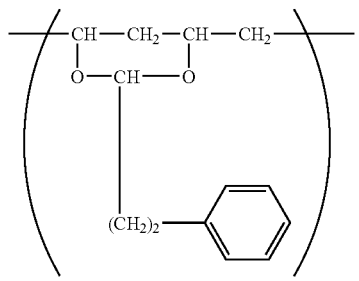

Tables 1 and 2 show the results.

COMPARATIVE EXAMPLE 5

A comparative electrophotographic photosensitive member 5 was produced in the same manner as in Example 1 except that Exemplified Resin (1) used in the charge generation layer in Example 1 was changed to Comparative Resin (D) having a repeating structural unit represented by the following structural formula, and the member was evaluated in the same manner as in Example 1.

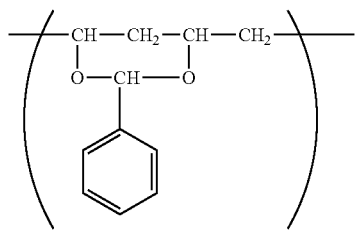

Tables 1 and 2 show the results.

COMPARATIVE EXAMPLE 11

A comparative electrophotographic photosensitive member 11 was produced in the same manner as in Example 11 except that Exemplified Resin (1) used in the charge generation layer in Example 11 was changed to a polyvinyl butyral resin (trade name: S-REC BX-1, manufactured by SEKISUI CHEMICAL CO., LTD.), and the member was evaluated in the same manner as in Example 1.

Tables 1 and 2 show the results.

COMPARATIVE EXAMPLE 21

A comparative electrophotographic photosensitive member 21 was produced in the same manner as in Example 21 except that Exemplified Resin (1) used in the charge generation layer in Example 21 was changed to a polyvinyl butyral resin (trade name: S-REC BX-1, manufactured by SEKISUI CHEMICAL CO., LTD.), and the member was evaluated in the same manner as in Example 1.

Tables 1 and 2 show the results.

COMPARATIVE EXAMPLE 22

A comparative electrophotographic photosensitive member 22 was produced in the same manner as in Example 21 except that Exemplified Resin (1) used in the charge generation layer in Example 21 was changed to Comparative Resin (A) obtained in the Comparative Synthesis Example 1, and the member was evaluated in the same manner as in Example 1.

Tables 1 and 2 show the results.

COMPARATIVE EXAMPLE 23

A comparative electrophotographic photosensitive member 23 was produced in the same manner as in Example 21 except that Exemplified Resin (1) used in the charge generation layer in Example 21 was changed to Comparative Resin (B) obtained in the Comparative Synthesis Example 2, and the member was evaluated in the same manner as in Example 1.

Tables 1 and 2 show the results.

COMPARATIVE EXAMPLE 24

A comparative electrophotographic photosensitive member 24 was produced in the same manner as in Example 21 except that Exemplified Resin (1) used in the charge generation layer in Example 21 was changed to aforementioned Comparative Resin (C), and the member was evaluated in the same manner as in Example 1.

Tables 1 and 2 show the results.

COMPARATIVE EXAMPLE 25

A comparative electrophotographic photosensitive member 25 was produced in the same manner as in Example 21 except that Exemplified Resin (1) used in the charge generation layer in Example 21 was changed to aforementioned Comparative Resin (D), and the member was evaluated in the same manner as in Example 1.

Tables 1 and 2 show the results.

COMPARATIVE EXAMPLE 31

A comparative electrophotographic photosensitive member 31 was produced in the same manner as in Example 31 except that Exemplified Resin (1) used in the charge generation layer in Example 31 was changed to a polyvinyl butyral resin (trade name: S-REC BX-1, manufactured by SEKISUI CHEMICAL CO., LTD.), and the member was evaluated in the same manner as in Example 1.

Tables 1 and 2 show the results.

COMPARATIVE EXAMPLE 32

A comparative electrophotographic photosensitive member 32 was produced in the same manner as in Example 31 except that Exemplified Resin (1) used in the charge generation layer in Example 31 was changed to Comparative Resin (B) obtained in the Comparative Synthesis Example 2, and the member was evaluated in the same manner as in Example 1.

Tables 1 and 2 show the results.

COMPARATIVE EXAMPLE 33

A comparative electrophotographic photosensitive member 33 was produced in the same manner as in Example 31 except that Exemplified Resin (1) used in the charge generation layer in Example 31 was changed to aforementioned Comparative Resin (C), and the member was evaluated in the same manner as in Example 1.

Tables 1 and 2 show the results.

COMPARATIVE EXAMPLE 34

A comparative electrophotographic photosensitive member 34 was produced in the same manner as in Example 31 except that Exemplified Resin (1) used in the charge generation layer in Example 31 was changed to aforementioned Comparative Resin (D), and the member was evaluated in the same manner as in Example 1.

Tables 1 and 2 show the results.

TABLE 1

| | Photosensitive property | | Photomemory property | | Coating property | Dispersion stability | |
|---|---|---|---|---|---|---|---|
| | $\Delta 500$ (cJ/m$^2$) | Residual potential (v) | $\Delta$VDPM (v) | $\Delta$VLPM (v) | External appearance | Initial particle size (μm) | Particle size after 3 months (μm)/Visual observation |
| Example 1 | 0.36 | 17 | −5 | −5 | Good | 0.30 | 0.35/Good |
| Example 2 | 0.42 | 21 | −5 | −10 | Good | 0.40 | 0.40/Good |
| Example 3 | 0.42 | 18 | −5 | −5 | Good | 0.40 | 0.42/Good |
| Example 4 | 0.43 | 16 | −5 | 0 | Good | 0.45 | 0.47/Good |
| Comparative Example 1 | 0.58 | 34 | −5 | −10 | Good | 0.44 | 0.60/A precipitate is present |
| Comparative Example 2 | 4.32 | 335 | Unevaluated | Unevaluated | Bad | Unable to measure owing to insufficient dispersion | |
| Comparative Example 3 | 0.44 | 14 | −10 | −10 | Bad | 0.85 | 0.78/A large amount of a precipitate is present |
| Comparative Example 4 | 0.46 | 12 | −5 | −10 | Good | 0.42 | 0.52/Good |
| Comparative Example 5 | 0.71 | 22 | −5 | −5 | Good | 0.52 | 0.69/A precipitate is present |
| Example 11 | 0.32 | 35 | −60 | −45 | Good | 0.19 | 0.15/Good |
| Comparative Example 11 | 0.40 | 69 | −150 | −110 | Good | 0.50 | 0.62/Good |
| Example 21 | 0.38 | 3 | −30 | −30 | Good | <0.1 | <0.1/Good |
| Example 22 | 0.45 | 4 | −35 | −30 | Good | <0.1 | <0.1/Good |
| Example 23 | 0.43 | 3 | −30 | −30 | Good | <0.1 | <0.1/Good |
| Example 24 | 0.37 | 3 | −25 | −25 | Good | <0.1 | <0.1/Good |
| Comparative Example 21 | 0.61 | 4 | −50 | −50 | Good | <0.1 | <0.1/Good |
| Comparative Example 22 | 1.60 | 285 | Unevaluated | Unevaluated | Bad | Unable to measure owing to insufficient dispersion | |
| Comparative Example 23 | 0.50 | 5 | −65 | −50 | Good | <0.1 | <0.1/Good |
| Comparative Example 24 | 0.36 | 7 | −60 | −40 | Good | <0.1 | <0.1/Good |
| Comparative Example 25 | 0.51 | 3 | −60 | −45 | Good | <0.1 | <0.1/Good |
| Example 31 | 0.23 | 8 | −5 | 0 | Good | <0.1 | <0.1/Good |
| Example 32 | 0.28 | 10 | −5 | 0 | Good | <0.1 | <0.1/Good |
| Example 33 | 0.24 | 9 | −5 | 0 | Good | <0.1 | <0.1/Good |
| Example 34 | 0.22 | 7 | −5 | 0 | Good | <0.1 | <0.1/Good |
| Comparative Example 31 | 0.34 | 7 | −20 | −20 | Bad | <0.1 | <0.1/Good |
| Comparative Example 32 | 0.28 | 8 | −20 | −20 | Good | <0.1 | <0.1/Good |
| Comparative Example 33 | 0.34 | 7 | −15 | −10 | Good | <0.1 | <0.1/Good |
| Comparative Example 34 | 0.30 | 8 | −15 | −10 | Good | <0.1 | <0.1/Good |

TABLE 2

| | N/N Variation after 2,000 times of duration (V) | N/L Variation after 2,000 times of duration (V) | H/H Variation after 2,000 times of duration (V) |
|---|---|---|---|
| Example 1 | 0 | +5 | −2 |
| Example 2 | −5 | +13 | −5 |
| Example 3 | 6 | +12 | −5 |
| Example 4 | 0 | +7 | 0 |
| Comparative Example 1 | −5 | +35 | −10 |
| Comparative Example 2 | Unevaluated | Unevaluated | Unevaluated |
| Comparative Example 3 | −5 | +30 | −15 |
| Comparative Example 4 | −5 | +35 | −10 |
| Comparative Example 5 | −5 | +30 | −10 |
| Example 11 | 0 | −3 | −9 |
| Comparative Example 11 | −25 | −58 | −30 |
| Example 21 | −5 | +10 | −10 |
| Example 22 | −10 | +20 | −20 |
| Example 23 | −5 | +15 | −15 |
| Example 24 | −5 | +10 | −15 |
| Comparative Example 21 | −20 | +45 | −30 |
| Comparative Example 22 | Unevaluated | Unevaluated | Unevaluated |
| Comparative Example 23 | −15 | +30 | −35 |
| Comparative Example 24 | +15 | +40 | −20 |
| Comparative Example 25 | −15 | +34 | −35 |
| Example 31 | 0 | −10 | +5 |
| Example 32 | −5 | −10 | +10 |
| Example 33 | 0 | −10 | +5 |
| Example 34 | 0 | −10 | −5 |
| Comparative Example 31 | −20 | −25 | −40 |
| Comparative Example 32 | +16 | −50 | +20 |
| Comparative Example 33 | +20 | −30 | +30 |
| Comparative Example 34 | −15 | −35 | +30 |

A "variation after 2,000 times of duration" having a + sign in Table 2 means that a light potential increased while a "variation after 2,000 times of duration" having a − sign means that a light potential reduced. In the case of, for example, N/L of Comparative Example 34, a light potential after VL duration involving 2,000 consecutive rotations is −200−(−35)=−165 [V].

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-353490, filed on Dec. 7, 2005, which is hereby incorporated by reference herein in its entirety.

The invention claimed is:

1. An electrophotographic photosensitive member, comprising:
   a support; and
   a photosensitive layer provided on the support,
   wherein the photosensitive layer comprises a charge generation layer comprising a charge generation substance and a charge transport layer comprising a charge transport substance,
   wherein the charge generation layer comprises a polyvinyl acetal resin comprising a repeating structural unit represented by one of the following formulas (1) to (4):

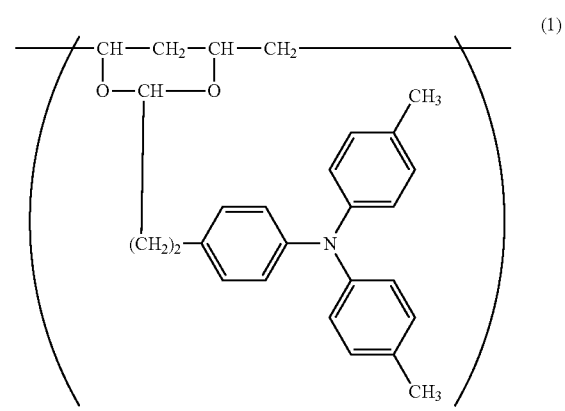

(1)

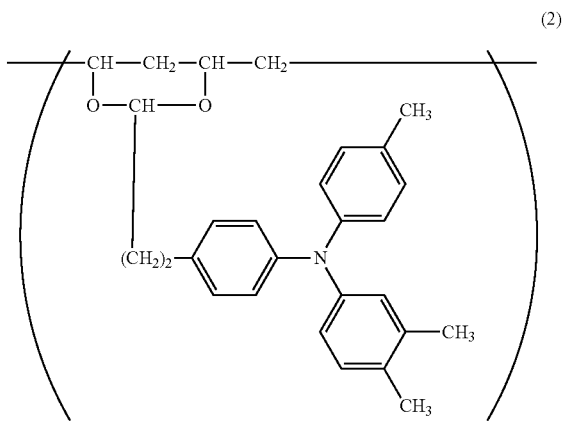

(2)

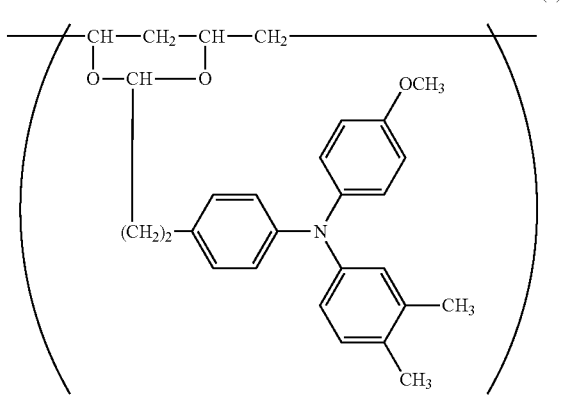

(3)

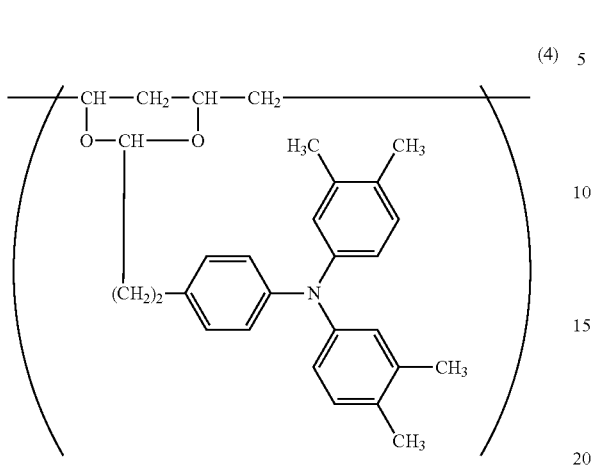

(4)

and wherein the charge generation layer comprises, as the charge generation substance, at least one of:

a hydroxygallium phthalocyanine crystal having a strong peak at a Bragg angle in CuKα characteristic X-ray diffraction of 7.4°±0.3° and 28.2°±0.3°; and a mixture of four azo compounds, each represented by a different one of the following structural formulas (CGM-2) to (CGM-5):

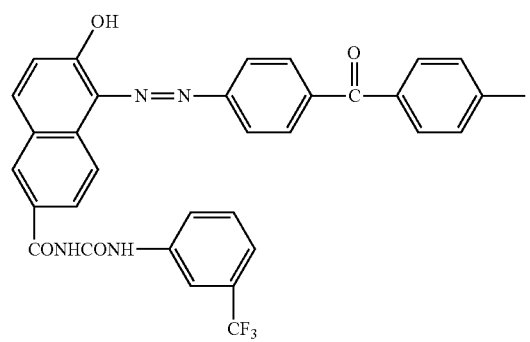

(CGM-2)

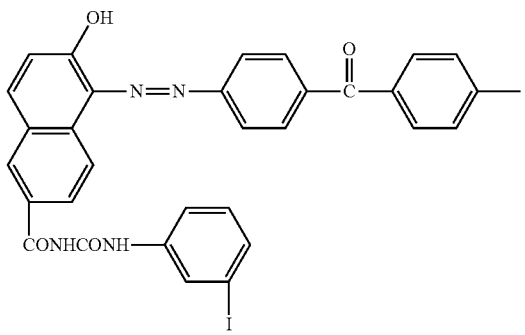

(CGM-3)

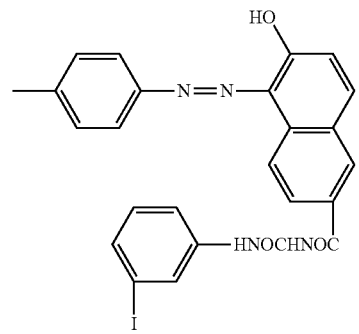

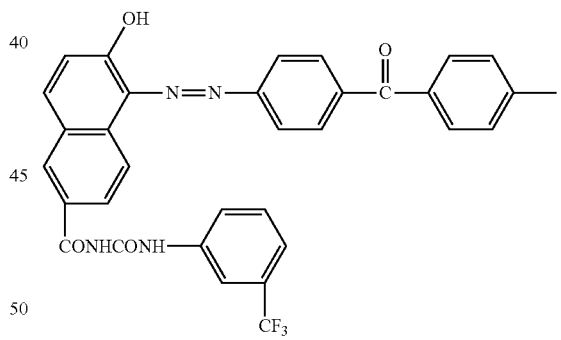

(CGM-4)

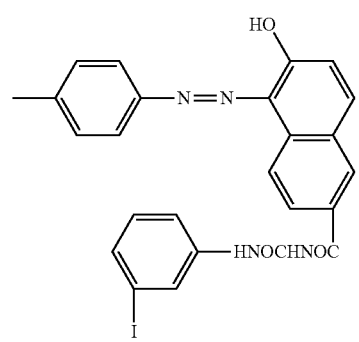

-continued

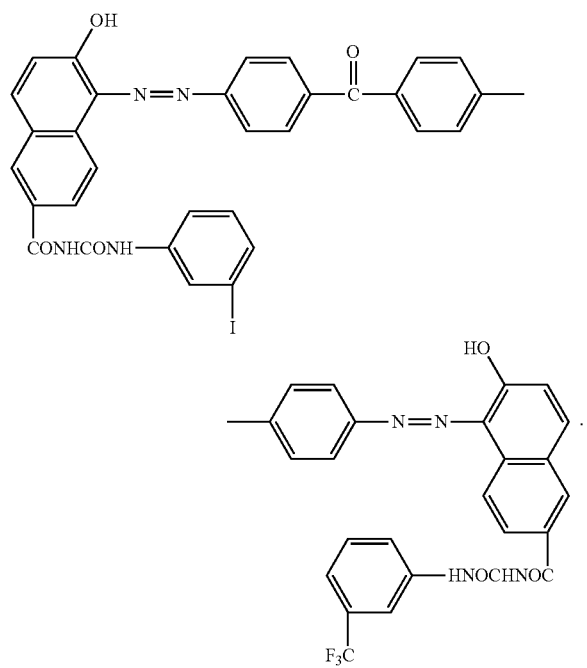

(CGM-5)

2. An electrophotographic photosensitive member according to claim 1, wherein the charge generation layer comprises, as the charge generation substance, the hydroxygallium phthalocyanine crystal having a strong peak at a Bragg angle in CuKα characteristic X-ray diffraction of 7.4°±0.3° and 28.2°±0.3°.

3. An electrophotographic photosensitive member according to claim 1, wherein the charge generation layer comprises, as the charge generation substance, the mixture of the four azo compounds.

4. An electrophotographic photosensitive member according to claim 2, wherein the hydroxygallium phthalocyanine crystal has a strong peak at a Bragg angle 2θ±0.2° in CuKα characteristic X-ray diffraction of 7.5° and 28.3°.

5. An electrophotographic photosensitive member according to claim 1, wherein the photosensitive layer is formed by applying a coating liquid for the photosensitive layer.

6. A process cartridge which: integrally supports the electrophotographic photosensitive member according to claim 1 or 3 and at least one means selected from the group consisting of a charging means, a developing means, a transfer means, and a cleaning means; and is detachably mountable in an electrophotographic apparatus main body.

7. An electrophotographic apparatus comprising:
the electrophotographic photosensitive member according to claim 1 or 3;
a charging means;
an exposing means;
a developing means; and
a transfer means.

* * * * *